P. EMBREE.
HARVESTER.
No. 38,626.              Patented May 19, 1863.
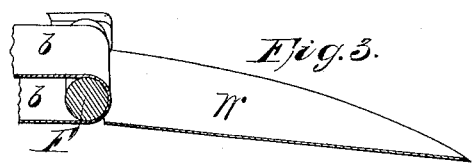
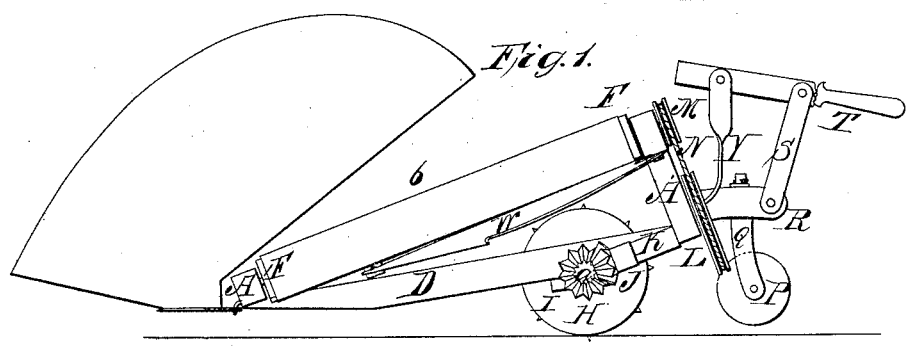
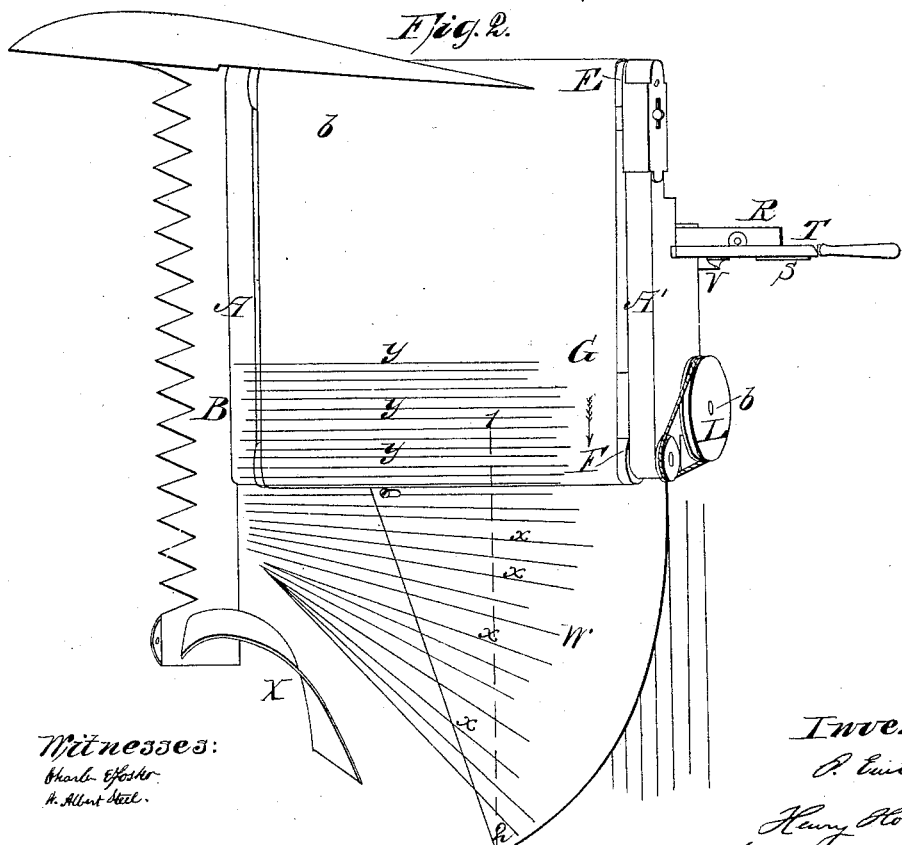

UNITED STATES PATENT OFFICE.

PEARSON EMBREE, OF WEST CHESTER, PENNSYLVANIA, ASSIGNOR TO HIMSELF AND JONATHAN SPEAKMAN, OF SAME PLACE.

IMPROVEMENT IN HARVESTERS.

Specification forming part of Letters Patent No. 38,626, dated May 19, 1863.

*To all whom it may concern:*

Be it known that I, PEARSON EMBREE, of West Chester, Chester county, Pennsylvania, have invented an Improvement in Harvesters; and I do hereby declare the following to be a full, clear, and exact description of the same, reference being had to the accompanying drawings, and to the letters of reference marked thereon.

My invention consists of an inclined platform and an endless apron, combined with and arranged on a harvester, substantially as described hereinafter, so as to turn the severed stalks of grain to a position parallel or nearly parallel with the cutting apparatus, and so as to lay the stalks in a continuous swath on the ground.

In order to enable others skilled in the art to make and use my invention, I will now proceed to describe its construction and operation.

On reference to the accompanying drawings, which form a part of this specification, Figure 1 is a side view of sufficient of a harvester to illustrate my improvement. Fig. 2 is a plan view, and Fig. 3 a section of part of Fig. 2 on the line 1 2.

Similar letters refer to similar parts throughout the several views.

The frame-work at the rear of the cutting apparatus B is composed of the two beams A and A', which are connected together by suitable transverse beams, D D. In one end of the frame turns a roller, E, and in the opposite end a similar roller, F, an endless apron, G, passing around the two rollers.

H is a driving-wheel bearing on the ground and secured to a shaft, $a$, which turns in the transverse beams D of the frame. To this shaft is secured a bevel-wheel, I, gearing into a similar wheel, J, on a shaft, $b$, which turns in a bracket, K, attached to the beam A' of the frame. A pulley, L, is secured to the shaft $b$, and round this pulley, as well as round a pulley, M, in the projecting journal of the roller E, passes a cord or strap, N; or, in place of the pulleys and cords, such gearing may be used that in drawing the frame over the ground a continuous traversing motion in the direction of the arrow, Fig. 2, will be imparted to the endless apron. A plain wheel, P, turns in a hanger, Q, which is arranged to swivel in a lever, K, the latter being hung to the frame and being connected by a rod, S, to a lever, T, the fulcrum of which is on a pin passing through the upper end of a plate, V, secured to the rear beam, A', of the frame.

As the cutting apparatus of the harvester and the gearing for driving the same form no part of my present improvements, it has not been deemed necessary to illustrate or describe the cutting apparatus in detail, or to show any of the many systems of gearing which may be adopted for operating the cutters.

To one end of the frame, and near the roller F, is secured a platform, W, which is inclined in the same direction as the apron, Fig. 1, as well as inclined downward from the point where it is secured to the frame to the outer end, as seen in Fig. 3. As the machine is drawn over the ground the severed stalks of grain (represented by the lines $y\ y$, Fig. 1) fall onto the inclined endless apron, which conveys them toward the inclined platform W. As soon as the stalks fall onto the latter their severed ends come in contact with the ground, the upper portion of the stalks resting on the platform. As the latter is inclined or lower at its outer than its inner end, the upper ends of the stalks must have a tendency to slide down the inclined platform, while the severed ends retain their position in contact with the ground.

As the machine is moved forward this tendency of the upper ends of the stalks to slide down toward the outer end of the platform is increased, and as the stalks crowd upon each other they gradually turn on their severed ends as centers, and assume the position represented by the radial lines $x\ x$, until they finally leave the platform and fall to the ground in a position parallel or nearly parallel with cutting apparatus, a continuous swath of stalks being thus deposited on the ground. The guard or shield X prevents the dispersion of the stalks and keeps them from spreading beyond proper limits.

The object of the swivel-wheel P on the arm R, and the lever T for raising and lowering that arm, is to raise the frame and elevate the driving-wheel H from the ground when the machine has to be turned.

I claim as my invention and desire to secure by Letters Patent—

The inclined platform W and endless apron G, combined with and arranged on a harvester for turning the severed stalks and laying the same in swaths on the ground, substantially in the manner described.

In testimony whereof I have signed my name to this specification in the presence of two subscribing witnesses.

PEARSON EMBREE.

Witnesses:
JOHN WHITE,
HENRY HOWSON.